Figure 1:
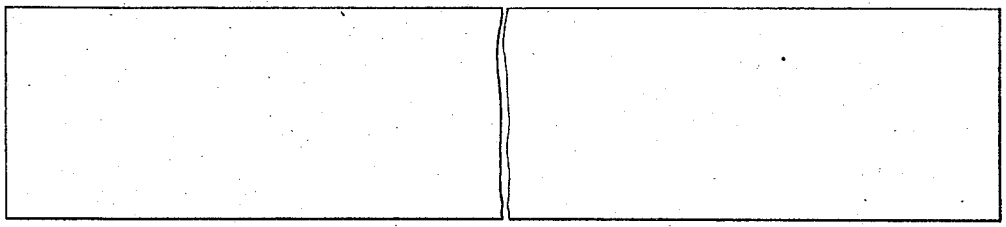

R. T. SMITH, Jr.
MANUFACTURE OF WHEELS.
APPLICATION FILED NOV. 12, 1910.

1,026,613.

Patented May 14, 1912.

2 SHEETS—SHEET 1.

WITNESSES

INVENTOR
ROBERT THOMAS SMITH, JR.
By
his Attorneys

R. T. SMITH, Jr.
MANUFACTURE OF WHEELS.
APPLICATION FILED NOV. 12, 1910.
1,026,613.
Patented May 14, 1912.
2 SHEETS—SHEET 2.
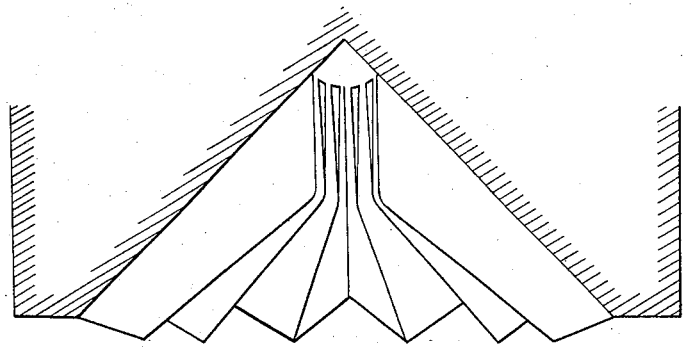
Fig. 4.
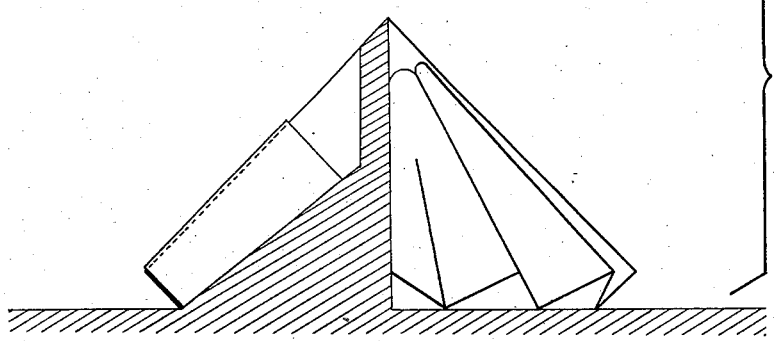
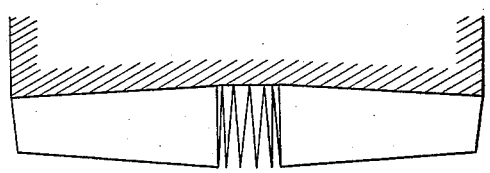
Fig. 5.
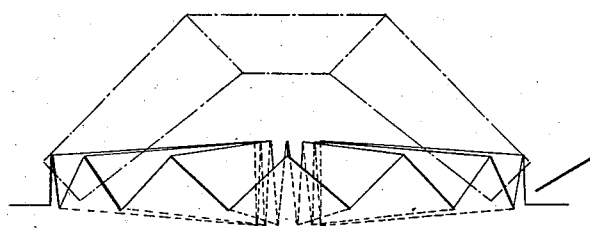
WITNESSES
INVENTOR
Robert Thomas Smith, Jr.
By Howson and Howson
his Attorneys.
COLUMBIA PLANOGRAPH CO., WASHINGTON, D. C.

UNITED STATES PATENT OFFICE.

ROBERT THOMAS SMITH, JR., OF WARRINGTON, ENGLAND.

MANUFACTURE OF WHEELS.

1,026,613.  Specification of Letters Patent. Patented May 14, 1912.

Application filed November 12, 1910. Serial No. 591,990.

*To all whom it may concern:*

Be it known that I, ROBERT THOMAS SMITH, Jr., a subject of the King of Great Britain and Ireland, of 111 Lovely Lane, Warrington, in the county of Lancaster, England, have invented new and useful Improvements in the Manufacture of Wheels, of which the following is a specification.

This invention relates to the manufacture of wheels wherein the body-part or web of the wheel between the tire and hub is made of corrugated metal, the invention consisting in an improved mode of corrugating said web.

The invention can be applied to wheels of any description, such, for example, as those used for vehicles, or as pulleys.

According to this invention the corrugated metal body parts or web is made by placing a metal cylinder, or cone-shaped body, between conical corrugated male and female dies and compressing such blank between the said dies. By this means the metal can be corrugated without danger of its being injured, and, by making the blank of various degrees of taper, or conical formation, the web can be formed with corrugations of any required depth at the hub and rim portions thereof. For instance, the corrugations may be of very considerable depth at the hub part, lessening in depth toward the rim part or even being flat at such rim part. If necessary, the operation can be effected in two, or more, successive pairs of dies if the ultimate form required cannot conveniently be made in one operation in one pair of dies. There is thus formed a corrugated web for use in the construction of wheels of any required description, for instance, for use as disks to hold between them a tire (or blocks constituting a tire) of resilient material, or to be used as webs in railway or other wheels, for example. The corrugations at the hub part of the web may be filled by welding filling pieces of metal therein and boring an axle hole in this filled central part for the reception of a hub, or axle. The rim part, or periphery, may be secured in any convenient manner to a tread, or tire.

In place of using two dies as described, one die may be used as a forming plate and the metal (in the shape of a cylinder cone, or disk, of sheet metal) may be pressed into the corrugations by rods, or formers, operated so as to each act to press the metal into a corresponding corrugation of the forming plate. These rods, or formers, can be mounted to act as levers and be operated by a cam, or depressing device, traveling around so as to operate each lever in turn.

The following description with reference to the accompanying drawing explains a way in which this invention can be performed.

Figure 2:
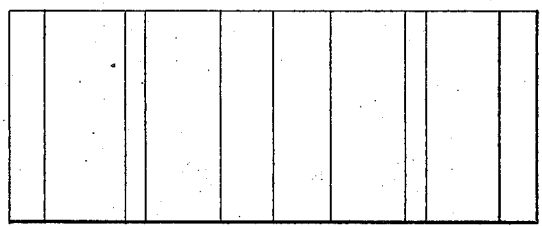
Figure 3:
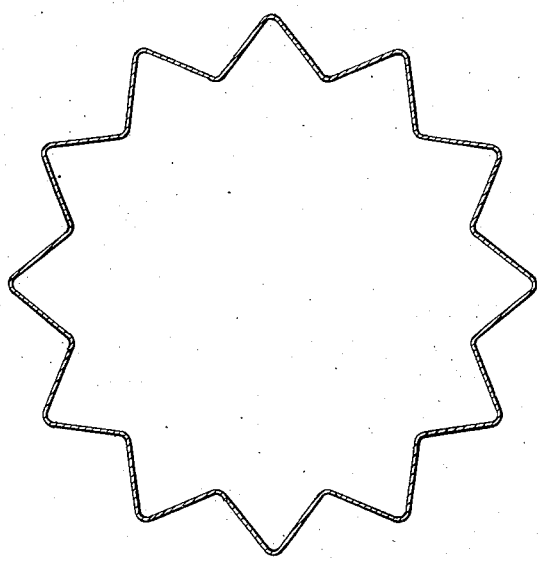

Figure 1 shows a strip of sheet metal from which the corrugated body part, or disk, is to be made; Figs. 2 and 3 show, in elevation and plan respectively, the said strip bent and welded into cylindrical form. It is shown also as being corrugated longitudinally to accord with the depth of corrugations at the largest diameter of the peripheral parts of the dies which are to operate upon it. Fig. 4 shows, partly in section, the lower and upper dies between which the cylinder is pressed, and Fig. 5 shows a second pair of dies for giving a more flattened form to the body part, or disk, when required.

When the cylinder of sheet metal is placed on the lower die, Fig. 4, and the upper die is brought down upon it, the sheet metal is readily pressed into a deeply corrugated conical formation. When this is required to be further flattened it can be placed on the lower die, Fig. 5, as shown in dotted lines, and the upper die be brought down upon it.

The cylinder of sheet metal can be made conical in accordance with the varying depths of corrugations required and, if the corrugations are to run into a flat periphery at the part of largest diameter, the sheet metal cylinder can be made plain, that is, without the longitudinal corrugations shown in Figs. 2 and 3.

If desired, the formation of the radial corrugations in the body part, or disk, may be made by a pair of dies formed to correspond with one of the radial corrugations and the said dies be successively caused to operate upon the strip as it is fed step by step between the dies so that a body part, or disk, is made therefrom like that made as hereinbefore described.

What I claim is:—

1. An improved method of forming radially corrugated wheel webs which consists in constricting the hub end of a longitudinally corrugated blank and pressing the resulting frusto-cone into disk form whereby the sides of the corrugations at the hub end of the blank are brought into proximity and the blank as a whole transformed into a radially corrugated disk.

2. An improved method of forming radially corrugated wheel webs which consists in bending a sheet of metal into a longitudinally corrugated annulus of cylindrical or conical form, constricting the hub end of said corrugated annulus and pressing the resulting frusto-cone into disk form, whereby the sides of said corrugations at the hub end of the blank are brought into proximity and the blank as a whole transformed into a radially corrugated disk.

3. An improved method of forming radially corrugated wheel webs which comprises the step of pressing a longitudinally corrugated frusto-conical blank into disk form whereby the sides of the corrugations at the hub end of the blank are brought into proximity and the blank as a whole transformed into a radially corrugated disk, substantially as described.

In testimony whereof I have signed my name to this specification in the presence of two subscribing witnesses.

ROBERT THOMAS SMITH, JUNIOR.

Witnesses:
CHARLES MARSH,
THOMAS OWEN THOMAS.

Copies of this patent may be obtained for five cents each, by addressing the "Commissioner of Patents, Washington, D. C."